(12) United States Patent
Austin

(10) Patent No.: US 7,087,169 B2
(45) Date of Patent: *Aug. 8, 2006

(54) COMBINED TIDAL VERTICAL FLOW AND HORIZONTAL FLOW WASTEWATER TREATMENT SYSTEM AND METHOD

(75) Inventor: David C. Austin, Taos, NM (US)

(73) Assignee: Dharma Living Systems, Inc., Taos, NM (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/134,620

(22) Filed: May 20, 2005

(65) Prior Publication Data

US 2005/0269260 A1    Dec. 8, 2005

Related U.S. Application Data

(63) Continuation of application No. 10/689,560, filed on Oct. 20, 2003, now Pat. No. 6,896,805.

(51) Int. Cl.
*C02F 3/32* (2006.01)
*C02F 3/30* (2006.01)

(52) U.S. Cl. .............. 210/602; 210/605; 210/622; 210/630; 210/150; 210/170; 210/747

(58) Field of Classification Search .......... 210/602, 210/605, 614–617, 620–622, 630, 747, 170, 210/195.1, 252, 259, 903, 908
See application file for complete search history.

(56) References Cited

U.S. PATENT DOCUMENTS

| | | |
|---|---|---|
| 681,884 A | 9/1901 | Monjeau |
| 2,306,027 A | 12/1942 | Swaney |
| 2,486,512 A | 11/1949 | Armstrong |
| 2,822,329 A | 2/1958 | Griffith |
| 3,770,623 A | 11/1973 | Seidel |
| 3,925,206 A | 12/1975 | Dea |
| 4,039,451 A | 8/1977 | Smith |
| 4,057,933 A | 11/1977 | Enyeart |
| 4,169,050 A | 9/1979 | Serfling et al. |
| 4,183,809 A | 1/1980 | Klapwijk et al. |

(Continued)

FOREIGN PATENT DOCUMENTS

CH    688235    *   6/1997

(Continued)

OTHER PUBLICATIONS

Solar Aqua Systems, Inc., Marketing brochure, 1978.

(Continued)

*Primary Examiner*—Fred G. Prince
(74) *Attorney, Agent, or Firm*—Allen, Dyer, Doppelt, Milbrath & Gilchrist, P.A.

(57) ABSTRACT

A wastewater treatment system includes a vertical flow marsh cell that is adapted to contain media and to support plants having roots extending into the media, the roots and media positioned to contact water flowing downward through the marsh cell during a flooding stage, the media and plant roots providing surfaces to which biofilms can adsorb, the biofilms containing bacteria adapted to adsorb ammonium ions and nitrify ammonium ions to nitrate during an aerated drained phase. The marsh cell is configured to receive water from an outlet of a horizontal wetland that functions essentially anaerobically/anoxically to contain bacteria for transforming nitrate into nitrogen gas. Water to be treated and water exiting the marsh cell outlet are transportable to a wetland inlet, providing dilution of incoming wastewater. Treated water is discharged from the wetland outlet.

22 Claims, 2 Drawing Sheets

U.S. PATENT DOCUMENTS

| | | | |
|---|---|---|---|
| 4,267,038 A | 5/1981 | Thompson |
| 4,331,538 A | 5/1982 | Kickuth |
| 4,333,837 A | 6/1982 | Plósz et al. |
| 4,384,956 A | 5/1983 | Mulder |
| 4,415,450 A | 11/1983 | Wolverton |
| 4,443,337 A | 4/1984 | Otani et al. |
| 4,678,582 A | 7/1987 | Lavigne |
| 4,735,723 A | 4/1988 | Mulder |
| 4,746,435 A | 5/1988 | Onishi et al. |
| 4,793,929 A | 12/1988 | Kickuth et al. |
| 4,839,051 A | 6/1989 | Higa |
| 4,872,985 A | 10/1989 | Dinges |
| 4,895,645 A | 1/1990 | Zorich, Jr. |
| 4,904,386 A | 2/1990 | Kickuth |
| 4,959,084 A | 9/1990 | Wolverton et al. |
| 5,078,882 A | 1/1992 | Northrop |
| 5,078,884 A | 1/1992 | Mulder |
| 5,087,353 A | 2/1992 | Todd et al. |
| 5,126,050 A | 6/1992 | Irvine et al. |
| 5,137,625 A | 8/1992 | Wolverton |
| 5,174,897 A | 12/1992 | Wengrzynek |
| 5,259,959 A | 11/1993 | Mulder |
| 5,337,516 A | 8/1994 | Hondulas |
| 5,389,257 A | 2/1995 | Todd et al. |
| 5,393,426 A | 2/1995 | Raskin et al. |
| 5,486,291 A | 1/1996 | Todd et al. |
| 5,518,618 A | 5/1996 | Mulder et al. |
| 5,531,896 A * | 7/1996 | Tambo et al. ............... 210/605 |
| 5,618,413 A | 4/1997 | Todd et al. |
| 5,733,453 A | 3/1998 | DeBusk |
| 5,766,474 A | 6/1998 | Smith et al. |
| 5,863,433 A | 1/1999 | Behrends |
| 5,863,435 A | 1/1999 | Heijnen et al. |
| 5,876,484 A | 3/1999 | Raskin et al. |
| 5,893,975 A | 4/1999 | Eifert |
| 5,897,777 A | 4/1999 | Zoeller et al. |
| 5,906,745 A | 5/1999 | Eto |
| 5,948,262 A | 9/1999 | Todd et al. |
| 5,951,866 A | 9/1999 | Grove et al. |
| 6,086,755 A | 7/2000 | Tepper |
| 6,126,827 A | 10/2000 | Johnson, Jr. et al. |
| 6,159,371 A | 12/2000 | Dufay |
| 6,183,642 B1 | 2/2001 | Heijnen et al. |
| 6,200,469 B1 | 3/2001 | Wallace |
| 6,277,274 B1 | 8/2001 | Coffman |
| 6,406,627 B1 | 6/2002 | Wallace |
| 6,447,681 B1 | 9/2002 | Carlberg et al. |
| 6,447,682 B1 | 9/2002 | Flowers |
| 6,517,724 B1 * | 2/2003 | Malone ..................... 210/618 |
| 6,645,374 B1 | 11/2003 | Cote et al. |
| 6,811,700 B1 | 11/2004 | Austin et al. |
| 6,830,688 B1 | 12/2004 | Austin et al. |
| 2002/0148779 A1 | 10/2002 | Shieh et al. |
| 2004/0000517 A1 | 1/2004 | Austin et al. |

FOREIGN PATENT DOCUMENTS

| | | |
|---|---|---|
| DE | 1916044 | 11/1969 |
| DE | 3941211 | 6/1991 |
| DE | 300 015 A7 | 5/1992 |
| GB | 2 182 651 | 5/1987 |
| JP | 58-70891 | 4/1983 |
| SU | 1346588 | 10/1987 |

OTHER PUBLICATIONS

Reed, Sherwood and Bastian, Robert, "Aquaculture Systems for Wastewater Treatment: An Engineering Assessment," U.S. Environmental Protection Agency Office of Water Program Operations Municipal Construction Division, 132 pages, Jun. 1980.

Jewell, W. J. et al., "Wastewater Treatment with Plants in Nutrient Films," U.S. Environmental Protection Agency, EPA-600/S2-83-067, pp. 1-5, Oct. 1983.

Jewell, William J., "Anaerobic Sewage Treatment," Environmental Science & Technology, vol. 21, pp. 14-21, Jan. 1987.

Zhu, T. et al., "Phosphorus Sorption and Chemical Characteristics of Lightweight Aggregates (LWA) Potential Filter Media in Treatment Wetlands," Wat. Sci. Tech., vol. 35, No. 5, pp. 103-108, 1997.

Austin, David, "Final Report on The South Burlington, Vermont Advanced Ecologically Engineered System (AEES) for Wastewater Treatment," U.S. Environmental Protection Agency, pp. i-M2, Mar. 4, 2000.

Sun et al., "Treatment of Agricultural Wastewater in a Combined Tidal Flow-Downflow Reed Bed System," Water Science Technology, vol. 40, No. 3, pp. 139-146, 1999.

Rakocy, James E., "Integrating Tilapia Culture with Vegetable Hydroponics in Recirculating Systems," Tilapia Aquaculture in the Americas, vol. 1, pp. 163-184, World Aquaculture Society, Baton Rouge, Louisiana, 1997.

McBride, Graham B. and Tanner, Chris C., "Modelling Biofilm Nitrogen Transformations in Constructed Wetland Mesocosms with Fluctuating Water Levels," Ecological Eengineering 14, pp. 93-106, Elsevier Science B.V., 2000.

Nguyen, Long M., "Organic Matter Composition, Microbial Biomass and Microbial Activity in Gravel-Bed Constructed Wetlands Treating Farm Dairy Wastewaters," Ecological Engineering 16, pp. 199-221, Elsevier Science B.V., 2000.

Tanner, Chris C. et al., "Effect of Water Level Fluctuation on Nitrogen Removal from Constructed Wetland Mesocosms," Ecological Engineering 12, pp. 67-92, Elsevier Science B.V., 1999.

Von Felde, Katrin and Kunst, Sabine, "N- and Cod-Removal in Vertical-Flow Systems," Water Science Technology, vol. 35, No. 5, pp. 79-85, Permagon Press, Oxford, 1997.

Green, Michal et al., "Investigation of Alternative Method for Nitrification in Constructed Wetlands," Water Science Technology, vol. 35, No. 5, pp. 63-70, Permagon Press, Oxford, 1997.

Laber, Johannes et al., "Two Strategies for Advanced Nitrogen Elimination in Vertical Flow Constructed Wetlands," Water Science Technology, vol. 35, No. 5, pp. 71-77, Permagon Press, Oxford, 1997.

Watson, J.T. and Danzig, A.J., "Pilot-Scale Nitrification Studies Using Vertical-Flow and Shallow Horizontal-Flow Constructed Wetland Cells," Constructed Wetlands for Water Quality Improvement, pp. 301-313, CRC Press, Inc., 1993.

Swoboda-Colberg, Norbert et al., "Constructed Vertical Flow Aerated Wetlands," U.S. Department of Commerce Final Report, pp. 1-54, Dec. 1994.

* cited by examiner

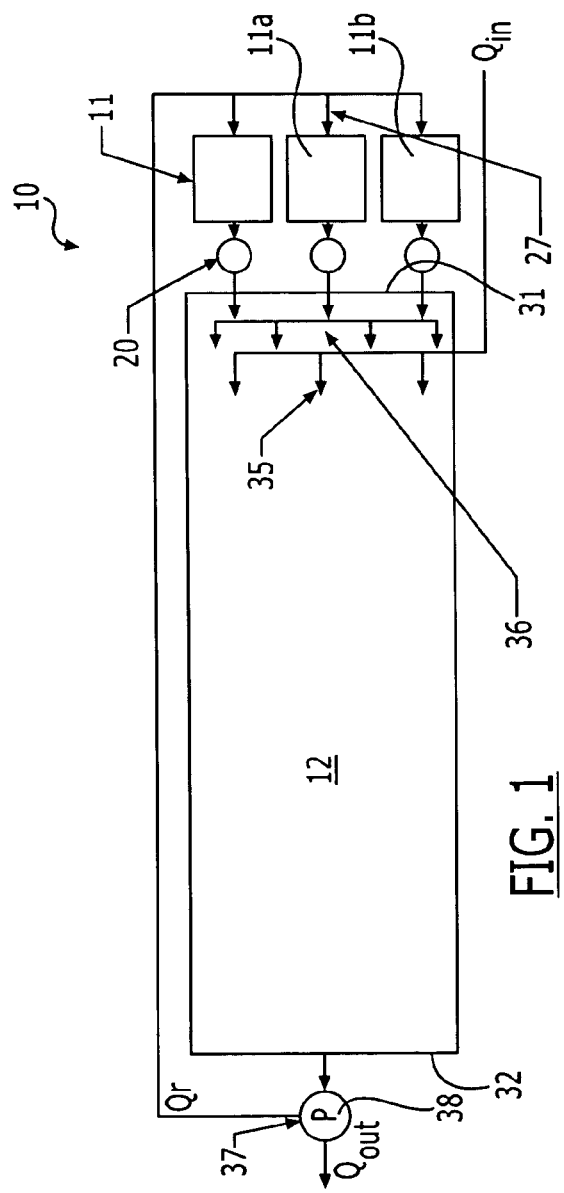
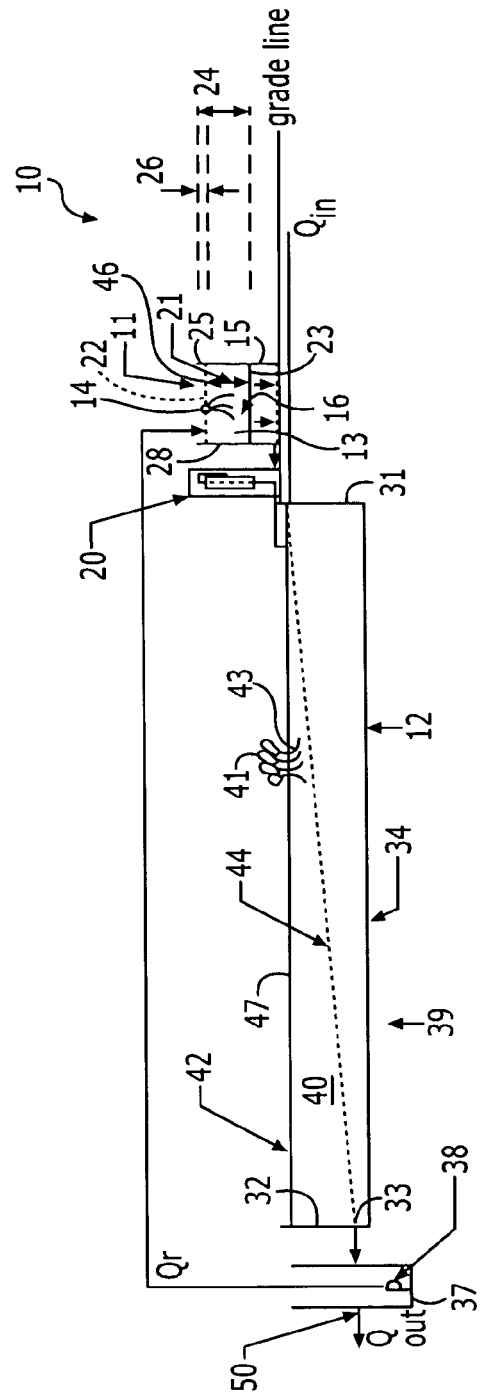

COMBINED TIDAL VERTICAL FLOW AND HORIZONTAL FLOW WASTEWATER TREATMENT SYSTEM AND METHOD

CROSS-REFERENCE TO RELATED APPLICATION

This application is a continuation of application Ser. No. 10/689,560, entitled "Tidal Vertical Flow Wastewater Treatment System and Method," filed Oct. 20, 2003, now U.S. Pat. No. 6,896,805, issued May 24, 2005.

BACKGROUND OF THE INVENTION

1. Field of the Invention

The present invention relates generally to wastewater treatment systems and methods, and, more particularly, to such systems and methods using bioremediation techniques.

2. Related Art

Engineered wetlands for wastewater treatment are known to have three basic hydraulic configurations: surface flow (SF), subsurface horizontal flow (SSHF), and vertical flow (VF). The first two are believed the most common, and are known to have significant design shortcomings. Even though an early wastewater treatment wetland design utilized vertical flow, design criteria are still considered experimental for vertical flow wetlands. Surface-loaded, vertical-flow wetlands are believed advantageous because surface loading forces flow through the root zone.

The basic hydraulic flow path for VF wetlands is for wastewater to be introduced at the wetland surface, pass through media and plant roots, then to flow out of the wetland via an underdrain system. Vertical flow wetlands are often designed to have a period of filling followed by a period of draining. When filled by wastewater, bacterial metabolism within the media depletes dissolved oxygen, producing anoxic or anaerobic conditions. As water drains, air is drawn down into wetland media, which is important to permit aeration of wetland media. Drain and fill cycles with a period of approximately a day or less are termed tidal flow. Previously known tidal flow systems are believed to have poor denitrification performance, with the exception of a reciprocating tidal flow system as taught by Behrends (U.S. Pat. No. 5,863,433).

Subsurface horizontal flow wetlands tend to provide better $BOD_5$ and TSS treatment than SF wetlands. Despite this advantage, both $BOD_5$ and TSS effluent values from SSHF wetland cannot reliably be expected to meet tertiary treatment standards. Nitrification in SSHF wetlands is notoriously poor.

An advantage of SSHF wetland design is that with no exposed water surface there is no place for disease vectors to breed. In practice this advantage is often not realized because of surfacing and ponding of wastewater resulting from clogging of wetland media. Surfacing and ponding of wastewater in SSHF wetlands is inherent to most designs. Interstices in gravel media eventually fill with organic and inorganic substances carried in or generated from the wetland influent. Channeling then occurs within the wetland media, degrading treatment. Horizontal flow path velocities are insufficient to carry inorganic fines and recalcitrant organic materials through the media to the wetland outlet. Typically, the inlet of the wetland will clog, forcing wastewater to the surface. Although wastewater will eventually submerge again into the downstream media, some ponding is unavoidable in this situation. Vectors can breed in these free wastewater surfaces.

With regard to the role of plants in SSHF wetlands, water flows through the gravel media in which plants are rooted. Contact of wastewater with plant roots has previously been thought to play a significant role in treatment; however, there is growing evidence that this is not the case. Results from studies comparing vegetated and unvegetated subsurface flow wetland treatment systems indicate that plants do not significantly impact treatment, even though there is strong evidence that the presence of roots in SSHF wetlands significantly affects the composition of microbial populations.

Findings of little or no contribution to treatment from plant roots in SSHF wetlands probably arise from the relationship between roots and media, and the growth characteristics of roots. The treatment effect of roots is likely to be poorly distinguished from that of media if the media surface area is very large compared with that of plant roots. Moreover, in subsurface horizontal flow wetlands roots tend to grow little below the permanently wetted media surface, creating only a shallow zone of root penetration. The greater hydraulic resistance created by the plant roots reduces wastewater flow in this zone. A dead zone frequently results due to the deposition of organic material and the lack of circulation and re-aeration in this zone. Obviously, the potential treatment role of roots cannot be determined if there is minimal root contact with wastewater.

Studies by Tanner et al. do provide convincing evidence that plants can play a significant treat role in flood and drain wetland cells. More research is required to further explore the role of plants in treatment wetlands. The emerging picture thus appears to be that the role of plants is sensitive to wetland hydraulic regime. It is likely that media selection also affects the apparent treatment role of plants.

Even though an early wastewater treatment wetland design utilized vertical flow, design criteria are still considered experimental for vertical flow wetlands. Surface-loaded, vertical-flow wetlands are believed advantageous because surface loading forces flow through the root zone.

The basic hydraulic flow path for VF wetlands is for wastewater to be introduced at the wetland surface, pass through media and plant roots, then to flow out of the wetland via an underdrain system. Vertical flow wetlands are often designed to have a period of filling followed by a period of draining. When filled by wastewater, bacterial metabolism within the media depletes dissolved oxygen, producing anoxic or anaerobic conditions. As water drains, air is drawn down into wetland media, which is important to permit aeration of wetland media. Drain and fill cycles with a period of approximately a day or less are termed tidal flow. Previously known tidal flow systems are believed to have poor denitrification performance, with the exception of a reciprocating tidal flow system as taught by Behrends (U.S. Pat. No. 5,863,433).

Most work with VF wetlands has been done in Europe, employing fine, sharp sand at the surface, underlain with coarser media. Plants root in the fine sand. The low hydraulic conductivity of the fine sand forces a temporary free water surface. Slow percolation through the saturated sand layer is thought to aid treatment. After completely draining, the previously flooded wetland cell is allowed to rest for a period, usually a few days, to permit reaeration of the sand layer. Without reaeration the sand in the interstices would eventually clog with accumulated wastewater constituents and biomass growing on wastewater nutrients.

European VF wetland designs appear to provide superior $BOD_5$ removal, nitrification, and total nitrogen removal than SF and SSHF wetlands, but removal of TSS may be better in SSHF wetlands. Some treatment wetlands are designed in combination, employing a VF wetland for nutrient removal, then followed by an SSHF wetland for TSS removal. Vertically loaded wetlands in series, followed by SSHF wetlands, have been investigated as well.

SUMMARY OF THE INVENTION

The present invention provides a system and method for treating wastewater, for example, municipal, agricultural, and industrial wastewater, to a predetermined level of purity. Another type of water that can be treated with the present invention includes storm water runoff from agricultural, suburban, and urban development.

The present invention comprises an integrated tidal vertical flow marsh modular (TVFMM) treatment system and associated methods. In a particular embodiment the predetermined treatment level may comprise advanced secondary standards, which are defined as $BOD_5 \leq 20$ mg/L, $TSS \leq 20$ mg/L, and $NH_3 \leq 5$ mg/L. Storm water is generally considered as weak wastewater, and herein the term wastewater is intended to include storm water runoff.

A particular embodiment of a wastewater treatment system according to the present invention, not intended to be limiting, can include a vertical flow marsh cell that is adapted to contain a first particulate media. The marsh cell has a top surface, an outlet adjacent a bottom thereof, and means for supporting plants so as to permit roots thereof to extend into the first media. The roots and the first media are thereby positioned to contact water flowing into and downward through the marsh cell.

The system also comprises a subsurface horizontal wetland that is adapted to contain a second particulate media and to support vegetative growth upon a top surface thereof. Again, this permits the roots to extend into the second media, so that the roots and the second media are positioned to contact water flowing substantially horizontally and downward through the wetland.

Means are provided for transporting water to be treated and water exiting the marsh cell outlet to a top surface of the wetland adjacent a first end thereof. Means are also provided for recycling water from an outlet adjacent a bottom of the wetland adjacent a second end to the marsh cell top surface. The second end is generally opposed to the first end. Means are further provided for discharging treated water from the wetland outlet.

Another aspect of the system is for improving a performance of a subsurface horizontal flow wetland wastewater treatment device. This system may be used, for example, to retrofit onto an existing SSHF wetland, and comprises a vertical flow marsh cell as above, and means for transporting water exiting the marsh cell outlet to a top surface of the wetland adjacent a first end thereof. Means are also provided for recycling water from a wasteland outlet adjacent a second end.

Alternate embodiments of these systems further include the first and the second media and plants positioned in the wetland and marsh cells.

A first method of the present invention, for treating wastewater, comprises the step of exposing wastewater to be treated to a first environment that is substantially anaerobic/anoxic. Next water is transported from the first environment to a second environment that contains a negatively charged surface to which ammonia ions can adsorb. The adsorbed ammonia ions are then aerated by exposure thereof to atmospheric oxygen when the second environment is drained, permitting nitrification of the ammonia ions into nitrate ions. The second environment is then flooded to permit the nitrate ions to desorb into bulk water, which is transported back to the first environment. In the first environment, the nitrate ions are exposed to bacterial respiration to yield nitrogen gas.

A second embodiment of a method of the present invention is for improving a performance of a substantially anaerobic/anoxic subsurface horizontal flow wetland wastewater treatment device. This aspect comprises the step of transporting water from the wetland to a second environment that contains a negatively charged surface to which ammonia ions can adsorb. The adsorbed ammonia ions are then aerated by exposure thereof to atmospheric oxygen when the second environment is drained, thereby permitting nitrification of the ammonia ions into nitrate ions. Next the second environment is flooded to permit the nitrate ions to desorb into bulk water, which is then transported back to the wetland, where the nitrate ions are exposed to bacterial respiration to yield nitrogen gas.

A third embodiment of a method of the present invention serves to improve consumption of human pathogens by incorporating a lagoon between the discharge of the wetland and final discharge of system effluent. Zooplankton within the lagoon consume biological particles of the size classes that comprise human pathogens. The lagoon may also serve to equalize recycle flow and store irrigation water.

The features that characterize the invention, both as to organization and method of operation, together with further objects and advantages thereof, will be better understood from the following description used in conjunction with the accompanying drawing. It is to be expressly understood that the drawing is for the purpose of illustration and description and is not intended as a definition of the limits of the invention. These and other objects attained, and advantages offered, by the present invention will become more fully apparent as the description that now follows is read in conjunction with the accompanying drawing.

BRIEF DESCRIPTION OF THE DRAWINGS

FIG. 1 is a plan view of an exemplary layout of the system of the present invention.

FIG. 2 is a cross-sectional view of an embodiment of the system of the present invention in passive flow mode.

DETAILED DESCRIPTION OF THE PREFERRED EMBODIMENTS

Figure 3:
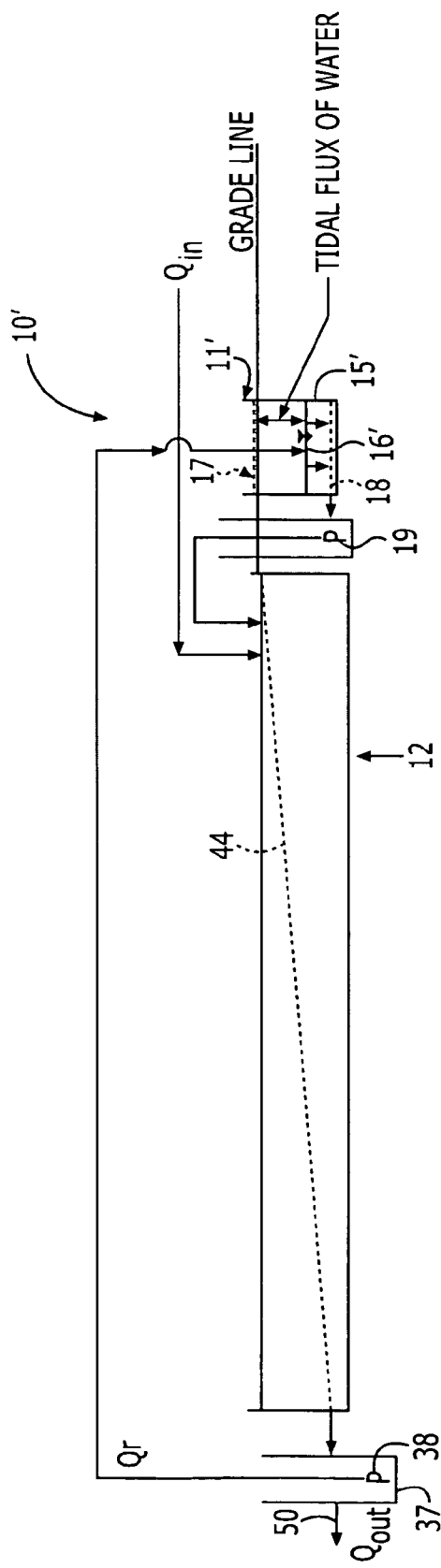
FIG. 3 is a cross-sectional view of a below-ground installation of a marsh cell of the present invention.

A description of the preferred embodiments of the present invention will now be presented with reference to FIGS. 1–3.

System Elements

A preferred embodiment of the present invention comprises a system 10 that includes a vertical flow marsh cell 11 in fluid communication with a subsurface horizontal flow wetland 12. The system 10 may be installed as depicted, or the marsh cell 11 and associated components may be added to an existing wetland 12 ("retrofit") to improve the performance thereof. Preferably, depending upon the site characteristics, the system 10 may comprise a plurality of marsh cells 11 shown here as three marsh cells 11,11a,11b, configured in parallel, although this is not intended as a limitation. As these are substantially identical, only one marsh cell 11 will be described herein. In another embodiment (FIG. 3), a below-ground system 10' with a marsh cell 11' is depicted.

In a preferred embodiment, the marsh cell 11 comprises a substantially impermeable basin 15 that is adapted to contain a first particulate media 13 and wetland plants 14 positioned atop the first media 13, and the marsh cell outlet comprises a bottom drain collection system 16. In a particular embodiment wherein the marsh cell 11 is installed above ground (FIG. 1), the basin 15 may comprise a modular, prefabricated unit. The means for transporting water exiting the marsh cell outlet 16 can comprise a drainage siphon 20.

Above-grade marsh cell positioning is attractive for ease of installation and the ability to use gravity drain siphons 20, which obviate the need for process pumping except for the recycle pump. This simplicity of hydraulic design is economical, and presents opportunities in regions where complex or high capital cost treatment technologies are not practicable or desirable.

In the case of a below-ground basin 15', as shown in FIG. 3, the means for transporting water exiting the marsh cell outlet 16' may comprise, for example, a level sensor 17 positioned within the basin 15', and an automatic valve assembly 18 actuated by the level sensor 17 (FIG. 3). The means for transporting water exiting the marsh cell outlet 16' may comprise, for example, a drain pump 19.

Selection of marsh media is critical to proper hydraulic design. Vertical flow wetlands previously known in the art are known to clog, as a result of excessive organic loading, typically those having fine sand and soil media. Among these are the standard European design, which employs fine sand that requires prolonged resting periods after loading and draining to avoid clogging. These periods range from several hours to days. Therefore, fine sand is inappropriate for tidal vertical marsh design because of the long obligatory drained resting periods. The first media 13 used in the present invention preferably comprises aggregates no smaller than one-millimeter ($d_{10}$) nominal diameter for tertiary treatment and no smaller than four millimeters ($d_{10}$) nominal diameter for primary and secondary treatment. The uniformity coefficient is preferably less than or equal to 4, with a value of less than or equal to 2 preferred. In some applications, high-porosity plastic media may comprise part of the first media 13. Media specifications allow drained resting periods as short a few minutes without significant loss of hydraulic conductivity. In some embodiments the first media 13 may comprise a plurality of layers of different media.

The type of aggregate material selected can also increase hydraulic conductivity. The preferred aggregate comprises expanded shale. Expanded shale is produced by the baking of shale in a rotary kiln at sufficient temperatures to induce vitrification of semi-molten, steam-expanded shale, thereby transforming shale into a lightweight ceramic product. The advantage of expanded shale is that it has a low bulk density, 55 to 60 lbs/ft$^3$. Low bulk density permits easier penetration by plant roots. Penetration of roots into expanded shale aggregate wetland beds has been observed to extend beyond two feet after only a few months of growth.

Preferably, the first media 13 in the basin 15 has a depth 21 from the top surface 22 to the basin bottom 23 that is less than or equal to 5 feet. Deeper depths are technically feasible, but unlikely to economically practical. Also preferably the basin 15 has a depth 24 from a top 25 to the bottom 23. A difference 26 comprising an operating depth is then left between the basin depth 24 and the first media depth 21 that is sufficient to permit the creation of a free water surface above the first media's top surface 22, typically less than or equal to 2 feet.

Water is discharged into the marsh cell 11 onto the first media top surface 22 via a low-head distribution system 27. Here a surface distribution system is not needed for the purposes of evenly distributing influent evenly over the marsh cell; rather, the purpose of the inlet system 27 is to disperse the energy of pumped influent sufficiently to avoid scouring of plants 14 and media 13. The inlet 27 is typically configured as a low-head system for energy efficiency. An example of a low-head distribution piping comprises a large-diameter, slotted irrigation pipe such is known to be used in agricultural applications. An open-channel distribution system is another example of a low-head distribution system.

Wetland plants 14 are positioned atop the first media's top surface 22 so as to permit their roots 28 to extend into the first media 13. Thereby the roots 28 and the first media 13 are positioned to contact water flowing into and downward through the marsh cell 11, with the roots 28 tending to prevent clogging.

A second major element of the system 10 comprises a subsurface horizontal flow wetland 30, which, as discussed above, can be installed contemporaneously with the marsh cell 11 or can have been previously installed. The wetland 30 extends from a first end 31 in fluid communication with the marsh cell outlet 16 and entering wastewater Q, to a second end 32, at which is positioned an outlet 33 adjacent the bottom 34.

Influent enters the wetland from two sources: first distribution piping 35 containing incoming wastewater to be treated Q, and second distribution piping 36 containing water exiting the marsh cell 11. In both cases the influent is distributed across the wetland's first end 31. The influent flows by gravity to the outlet 33 at the second end 32, from which at least some of the water $Q_r$ proceeds to a sump 37 containing a recycle pump 38. Axial flow propeller pumps and airlift pumps are examples of low-head hydraulic conveyance machinery usable as recycle pumps 38. Overflow discharge $Q_{out}$ from a discharge outlet 50 in the sump 37 comprises the system effluent.

The wetland 30 itself typically comprises a basin 39 adapted to house a second particulate media 40. Again, wetland plants 41 are positioned on the top surface 42 of the media 40, so as to permit the roots 43 to extend into the second media 40. Thus the roots 43 and the media 40 are positioned to contact water flowing substantially horizontally and downward from the top surface 42 at the first end 31 to the outlet 33 at the bottom 34 at the second end 32, illustrated schematically in FIG. 1 with the vertical scale exaggerated as a hydraulic grade line 44.

The flow-through capacity of the wetland 30 is not limited by the hydraulic conductivity of the engineered aggregate bed. Fine gravel ($d_{10}$=8 mm) and medium gravel ($d_{10}$=32 mm) comprise the size range commonly specified for media 40 in SSHF wetlands. The hydraulic conductivity of these media 40 when clean are 16,400 ft/d and 32,800 ft/d, respectively. Design hydraulic conductivity of these media 40 for wastewater treatment applications is reduced by 90% to 1,640 ft/d and 3,280 ft/d, respectively. A reduction in design hydraulic conductivity of ~67% has been recommended in the literature. These drastic safety factors are in part due to the reduction of the effective media porosity by plant roots and tubers, but reduction in porosity is mostly due to entrapment of influent solids in media pore spaces and by the accumulation of biofilms that reduce the mean pore diameter.

The hydraulic capacity of a subsurface horizontal flow wetland 30 receiving recycle flow may be of concern for some retrofit designs. Distribution of recycle flow over the length of wetland 30 may be desirable in these instances. Standard treatment wetland design uses a very conservative fraction of the hydraulic conductivity of wetland media. It is therefore likely that concerns of hydraulic capacity would be readily addressed by increasing the slope of the hydraulic gradient 44 for the horizontal flow path by alteration or adjustment of the horizontal wetland outlet 33 structure.

A level-sensing device or timer linked to an electromechanical or programmable logic controller may be used to actuate the recycle pump 38 to recycle a substantial portion of the wetland effluent to the marsh cells 11. Alternatively, recycle pumping may be substantially constant in applications where the recycle pump 38 is located in a large-volume, flow-through sump 37 or pond that receives discharge from the wetland 30. Manual operation actuation is also an option. In some system configurations, a constant recycle rate may be set.

As described above, the marsh cells 11,11a,11b fill with the recycled effluent and then discharge to the wetland's first end 31. It is believed preferable that the distribution system 27 be configured to split substantially equal recycle flows among the marsh cells 11,11a,11b, in the embodiment having a plurality thereof. Preferably the wetland 30 is designed to have essentially no free water surface thereon.

Ecological design is an important element of integrated treatment systems 10. Ecological design is defined here as the explicit incorporation of ecological science into the process design of the system 10. Key design elements create conditions favorable to plant growth and the establishment of a robust community of protozoa and invertebrates that consume bacterial biomass.

Establishing complete plant 14,41 coverage of marsh and wetland top surfaces 22,42 within one growing season is important to the function of the system 10. Plant shoots or plugs are typically planted on a grid pattern in constructed wastewater treatment wetlands. To quickly establish complete plant coverage, the present system 10 in a preferred embodiment uses commercially available coir (coconut fiber) geotextile fabric with partially mature plants already growing in it. A first coir mat 46 is positioned atop the marsh cells 11; a second coir mat 47, atop the wetland 30. Pregrowth not only ensures rapid plant acclimation to the system 10, but also establishes an "instant" ecosystem. Pregrowth of plants 14,41 is done in shallow ponds where invertebrate communities quickly colonize the coir/plant matrix. Even partial coverage of the marsh cells 11 and wetland 30 results in rapid growth of plants 14,41 across the marsh 22 and wetland 42 surfaces. Quick establishment of plants and aquatic invertebrates is an important design element of the system 10.

Knowledge of the habitat and feeding biology of aquatic invertebrates is used to inform the design of the system 10. The purpose of this design philosophy is to use aquatic invertebrate organisms to consume biological and organic particles present in wastewater and generated within the wastewater treatment system. Consumption of biological and organic particles by aquatic invertebrates, complemented by endogenous respiration of bacteria present in biofilms formed on the media 13,40 and plant roots 28,43, is designed to almost entirely eliminate the need to remove biosolids (yield) from the system 10. Yield can be reduced to negligible quantities because of endogenous respiration and complex webs of consumption that are based on bacterial biomass.

The community structure of these grazing organisms is self-organizing and can be highly complex, but is controlled by large-scale mechanisms. The large-scale mechanisms comprise the engineering design elements.

Hydraulic Design

The overall hydraulic regime in the present system 10 involves fill and drain cycles of the marsh cells 11 in which wastewater is pumped from the wetland outlet 33 or from, for example, a pond, to the marsh cell top surface 22. The marsh cells 11 then discharge into the head 31 of the wetland 30. The vertical flux of water in and out of the marsh cells 11 is designed to cycle several times per day, and is therefore referred to as tidal. Hydraulic design integrates passive forward flow in the wetland 30, tidal flow in the marsh cells 11, and recycle flow into one design.

The hydraulic residence time of individual tidal marsh cells 11 is typically a fraction of a day and is likely to be less than an hour for many designs. Low residence time is desirable for the treatment process and permits prefabricated marsh basins 15' to be small enough to install with commonly available construction equipment.

Influent to each marsh cell 11 flows through plant roots 28 and first media 13. During the fill stage influent may not flow downward evenly throughout the first media 13 in all designs, but flow is substantially vertical during drainage. A key element of cell hydraulics is that the drain discharge rate is preferably significantly higher than the influent rate. One embodiment may comprise a control system to close and open valves to effect drainage. However, it is believed preferable to continually load the marsh cells 11 at a low enough rate such that when the drainage siphon 20 is activated or a drain valve opened, the marsh cell 11 will drain.

Recycle pumping continues such that some marsh cells 11 are full, some drained, and others filling. The minimum number of marsh cells 11 is one, more than one is preferable, and the maximum number is determined by design criteria specific to a given project.

Process Design

Process design integrates conventional wetland treatment and tidal marsh technologies that not only substantially improves the performance of existing conventional treatment wetlands, but also presents new design opportunities for integrated tidal and horizontal flow technologies. Process design includes elements of environmental and ecological engineering design that substantially improve the state of art of wetland wastewater treatment, and improve the art of wastewater treatment in general.

Process design includes the combined capacity of the wetland 30 and tidal marsh 11 components. Because influent wastewater Q comprises many constituents that are removed by a variety of mechanisms, the fate each major constituent must be accounted for within the treatment system (Table 1).

TABLE 1

Fate of Wastewater Constituents in Integrated TVFMM Treatment System

| Influent Wastewater Constituents | Fate within the Horizontal Flow Wetland | Fate within the Tidal Marsh Cells |
|---|---|---|
| $BOD_5$ | Aerobic/anoxic conversion to bacteria biomass (VSS); conversion | Anaerobic/anoxic conversion of bacterial biomass (VSS); conversion |

TABLE 1-continued

Fate of Wastewater Constituents in
Integrated TVFMM Treatment System

| Influent Wastewater Constituents | Fate within the Horizontal Flow Wetland | Fate within the Tidal Marsh Cells |
|---|---|---|
| TKN | to $CO_2$ by heterotrophic respiration Conversion to $NH_4^+$ | to $CO_2$ by heterotrophic respiration Greater than 95% conversion to $NH_4^+$ |
| $NH_4^+$ | Oxidation by anaerobic ammonia oxidizing bacteria; sorption on marsh cell media, biofilms, organic material, and plant roots; minor nitrification | Substantial nitrification mediated by sorption chemistry (nitration process described in text) |
| $NO_3^-$ | Denitritication to $N_2$ and $NO_x$; primary source of nitrate (and nitrite) is discharge from marsh cells | Conversion to $N_2$ and $NO_x$ (denitrification in flooded stage; desorption from biofilms into bulk water when marsh cells are flooded |
| TSS | Inorganic constituents filtered out | Inorganic constituents filtered out |
| VSS | Conversion to $BOD_5$ and TKN; conversion to $CO_2$ and water by endogenous respiration | Conversion to BOD5 and TKN; conversion to $CO_2$ and water by endogenous respiration |
| Human Enteric Pathogens | Substantial reduction (1–3 log) | Substantial reduction (1–3 log) |

Since a horizontal subsurface flow wetland has, by design, no free water surfaces, diffusion of atmospheric oxygen into bulk wastewater is limited. The high oxygen demand of wastewater establishes anaerobic conditions throughout most, if not all, of a conventional subsurface flow wetland. The overall effect of the low oxygen concentrations or anaerobic conditions is to slow the rate at which wastewater constituents are converted to desirable end products (see Table 1).

In the present system 10, tidal marsh hydraulics nitrify and aerate wastewater. Discharge to the wetland 30 further aerates tidal marsh effluent. The combined effect of tidal marsh hydraulics is to raise the oxidation-reduction potential (ORP) of the wetland 30. Design treatment processes then occur at a higher rate because of the increased ORP.

Tidal fluctuation aerates media biofilms, which also aids in the metabolism of extra polymeric substances (EPS). Bacterial biomass is often 90% or more EPS, as opposed to pure cellular biomass. Therefore, metabolizing EPS counteracts the tendency of biofilms to bridge media pore spaces. Plant roots tend to prevent clogging in vertical-flow wetlands. Therefore, tidal vertical flow hydraulics tends to maintain design hydraulic flow paths. In contrast, horizontal subsurface flow wetlands frequently tend to channel and clog, in large part because of the anaerobic conditions that slow digestion of accumulated organic material sieved by wetland media.

Recycling provides substantial nominal dilution ratios for marsh cells 11 receiving influent wastewater. Dilution of the influent to the wetland 30 partially buffers sharp drops in ORP caused by peak mass loading events, which could slow or upset process rates. Dilution also stimulates the endogenous respiration of biofilms because it causes low concentrations of labile carbon in bulk water. Endogenous respiration of biofilms prevents excessive build-up of bacterial biomass, thereby tending to preserve the hydraulic conductivity of the wetland media 40.

The design purpose of the system 10 is to provide up to advanced tertiary treatment, and advanced secondary treatment at a minimum (Table 2). Wastewater contains many constituents, with those of concern here being biochemical oxygen demand (BOD), volatile suspended solids (VSS), total suspended solids (TSS), total Kjeldahl nitrogen (TKN), ammonia ($NH_4^+$), nitrate ($NO_3^-$), total nitrogen (TN=TKN+ $NO_3^-$+$NO_2^-$), and pathogens. These constituents are removed from wastewater in the marsh cell 11 as described in Table 1.

TABLE 2

Integrated TVFMM System Treatment
Standards for Domestic Sewage

| Wastewater Constituent | Advanced Secondary Treatment Standards | Tertiary Treatment Standards |
|---|---|---|
| BOD (mg/L) | $\leq 20$ | $\leq 10$ |
| $NH_3$ (mg/L) | $\leq 5$ | $\leq 1$ |
| TN (mg/L) | $\leq 20$ | $\leq 10$ |
| TSS (mg/L) | $\leq 20$ | $\leq 10$ |
| Fecal coliforms (mpn/100 ml) | $\leq 100$ | $\leq 100$ |

The system 10 relies substantially on nitrate to drive consumption of organic carbon in wastewater (as measured by BOD or COD). Data indicate that nitrification and denitrification in marsh cells are governed by adsorption chemistry. In this process, $NH_4^+$ ions in bulk water adsorb to negatively charged biofilms on the media 13 and plant roots 28. Atmospheric oxygen is drawn down into media 13 pore spaces when the marsh cell 11 drains, causing rapid aeration of biofilms and subsequent nitrification of adsorbed $NH_4^+$ ions. Nitrate in biofilms desorbs into bulk water in the next flooding cycle. Nitrate is then rapidly consumed in bacterial respiration of carbon. The term nitration is coined here, by analogy to aeration, as a convenient way to denote the transfer of nitrate to bulk water by the ammonia sorption/ nitrate desorption process.

Marsh cell design transfers oxygen directly into bulk wastewater primarily by passive atmospheric diffusion across open water surfaces in the marsh cells 11. Transfer of oxygen across bulk water surfaces is a low-rate process. Mechanical aeration of water is therefore ubiquitous in wastewater treatment systems. Oxygen transfer efficiency is greatly limited by the low solubility of oxygen in water. Clean, cold freshwater saturates at 10 to 12 mg/L $O_2$. Saturation of $O_2$ in wastewater is substantially less. The oxygen transfer efficiency of mechanical aeration processes in wastewater is typically on the order of 5–20% depending on a variety of factors.

In contrast to oxygen, nitrate is highly soluble in water. Organic carbon and ammonia (TKN) is typically present in wastewater in concentrations from 20 to 85 mg/L, which is several times that of the saturation value of oxygen in wastewater. The low-head pumps 19 used in some embodiments to drain the marsh cells 11 have mechanical transfer efficiencies on the order of 60–80%. Therefore, TKN is converted to nitrate via a mechanical means that is several times more efficient than mechanical transfer of oxygen to bulk wastewater. Nitrate per kilogram has the same oxidizing capacity of 2.86 kilograms of oxygen. Thus the overall energy efficiency for BOD (or COD) destruction of the nitration process is substantially greater than aeration.

Oxygen for nitrification is provided during the post-drainage period when air is in contact with biofilms in the marsh cell beds. Ammonia ions absorbed in biofilms nitrify when in contact with atmospheric oxygen as a consequence of bacterial metabolism. Desorption of nitrate during the fill phase provides significant quantities of nitrate to drive bacterial metabolism of labile carbon in the bulk liquid. It should be noted that many bacteria use nitrate as terminal electron acceptor even in the presence of high dissolved oxygen concentrations.

Nitration and semi-passive aeration permit the system footprint to be substantially smaller than other treatment wetland designs because of the positive effect nitration has on process kinetics. In retrofit applications the treatment footprint may not shrink, but treatment capacity is significantly enhanced.

Modeling of nitration and aeration processes appears to be complex because of inherent difficulties measuring key parameters for thin biofilm kinetics. However, insight into the efficiency of nitration and aeration in the system 10 is straightforward using classic oxygen demand stoichiometry and oxygen transfer kinetics to bulk water.

Bulk water oxygen demand in wastewater for activated sludge processes is calculated using the following formula:

$$\text{mg/L } O_2 \text{ demand} = (COD_{influent} - COD_{effluent}) + 4.6(NO_3)_f - 2.86(NO_3)_u \quad (1)$$

where: COD is in mg/L, $(NO_3)_f$ is the nitrate formed in mg/L, $(NO_3)_u$ is the amount of nitrate utilized in mg/L. The conversion factor for cells to COD=1.42.

The nitrification oxygen demand term in Eq. (1) for bulk water oxygen demand drops out in the process of the present invention. Nitrate is formed in drained marsh cells 11, removing the nitration term $(4.6(NO_3)_f)$ from the equation. Thus oxygen demand for bulk water can be determined in the marsh cells 11 as follows:

$$\text{mg/L } O_2 \text{ demand} = (COD_{influent} - COD_{effluent}) - 2.86(NO_3) \quad (2)$$

Thus in Eq. (2) a significant fraction of COD is consumed by nitrate, formed when marsh cells 11 drain and desorbed into bulk water when marsh cells 11 are flooded. Furthermore, nitrate not consumed within the marsh cells 11 satisfies a substantial portion of the oxygen demand within the horizontal flow wetland 30. The difference in oxygen demand as calculated by the above equations for the same wastewater flow and influent parameters is significant (Table 3). The nitration process reduces bulk-water oxygen demand by 20–50%. The actual percent reduction is sensitive to the influent COD:TKN ratio.

TABLE 3

Comparison of Bulk-Water Oxygen Demand

| System | Influent COD, mg/L | Influent COD, mg/L | Influent TKN, mg/L | Percent conversion of TKN to nitrate | Nitrate formed, mg/L | Effluent nitrate, mg/L | Oxygen demand, mg/L |
|---|---|---|---|---|---|---|---|
| Activated sludge (with nitrification and denitrification) | 400 | 10 | 45 | 95% | 42.75 | 5.0 | 481 |
| Integrated TVFMM Act. sludge | 400 | 10 | 45 | 95% | 42.75 | 0.05 | 267 |
| | mg/L $O_2$ = (400 − 10) + 4.6(42.75) − 2.86(42.75 − 6.0) | | | | | | |
| TVFM | mg/L $O_2$ = (400 − 10) − 2.86(42.75 − 0.05) | | | | | | |

Recycle pumping also aerates wastewater introduced into the marsh cells 11. Actual aeration rates are highly dependent on marsh cell inlet design.

Biochemical oxygen demand is removed from wastewater in the marsh cells 11, mostly through anoxic and aerobic processes, as previously described.

Raw wastewater contains suspended solids that are either organic or inorganic nature. Bacteria grow on wastewater nutrients, thereby producing additional organic solids that are either suspended in bulk water or fixed as biofilms on solid substrates. Yield of bacterial biomass grown from influent nutrients is defined as mass units of bacteria produced from mass units of influent BOD and total nitrogen. Suspended solids, yield, and biofilms are all related in the present system 10, and all must be accounted for in the treatment process. As will be described, mechanisms of in situ digestion of VSS and biofilms are key elements that reduce yield to a fraction that is effectively zero on an annual operating basis.

Total suspended solids (TSS) is a lumped parameter that measures the organic and inorganic particle mass in a water sample. Volatile suspended solids (VSS) is the measure of the organic content of TSS. After degritting, TSS in wastewater is composed almost entirely of VSS. Most organic particles in domestic sewage or industrial food wastes will be transformed into labile nutrients by bacterial action. Labile nutrients are BOD and have the same fate as BOD described above.

Volatile suspended solids entering a surface flow wetland largely settle out or are retained on plant thatch. Over time the VSS is converted to BOD and TKN by hydrolysis, and to $CO_2$ and water by endogenous respiration and consumption by grazing organisms. The high ORP conditions induced by the tidal marsh cells 11 speed this process of VSS conversion.

Volatile suspended solids entering a SSHF flow wetland 30 are retained on wetland media 40. Over time the VSS is converted to BOD and TKN by hydrolysis, and to $CO_2$ and water by endogenous respiration. The ORP values are typically less than in an SF wetland; therefore, the rate of these processes within the SSHF wetland is more dependent on input of nitrate and oxygen from the tidal marsh cells than in the SF wetland.

Volatile suspended solids mass flux to marsh cells 11 is small because the horizontal flow wetland effluent is low in VSS. The VSS in marsh cells 11 is retained on marsh root mats 28 and media 13, where it is subjected to oxidation and endogenous respiration when exposed to the atmosphere.

Without the tidal flow action that periodically drains vertical flow marshes, excessive VSS would accumulate in media interstices. Excessive accumulation of VSS, in the form retained biological and organic particles, would result in unacceptable headloss and, ultimately, clogging of marsh media 13.

Tidal flow exposes VSS to the atmosphere, ensuring drainage to near field capacity and rapid aeration. At field capacity, water is held in thin films on media and root surfaces. In thin films, diffusion of oxygen from the atmosphere is rapid. Oxygen concentration in the atmosphere is on the order of 250 mg/L, whereas in wastewater it seldom exceeds 4 mg/L. Tidal drainage of the marsh cells therefore permits aerobic degradation of VSS that is not rate limited by oxygen concentrations. Aerobic degradation is a process of endogenous respiration within biofilms and consumption of biofilms by (obligate aerobic) microinvertebrate populations. The result of this degradation process is a high rate of in situ VSS digestion by endogenous respiration that prevents excessive accumulation of organic and biological mass within the marsh media.

Yield is measured as mass of excess volatile suspended solids produced per mass of influent BOD(kg $VSS_{out}$/kg ($BOD_{in}$–$BOD_{out}$) in activated sludge systems. In the present system 10 measurement of yield is not so straightforward because biofilms on marsh media 13 and plant roots 28 contain most of bacterial growth. Excess bacterial growth in the system 10 is manifested in clogging of media beds as biofilms grow to substantially fill media pore spaces. A net yield of effectively zero is manifested as long-term operation without substantial loss of media hydraulic conductivity.

Effective net zero yield is essential for the long-term operation of the system 10. Draining of marsh cells 11 and process recycle are the means to achieve effective net zero yield. Just as VSS retained in drained marsh bed is exposed to atmospheric oxygen, so are biofilms within the bed. The high dissolved oxygen concentrations within drained bed pore spaces induce endogenous respiration of biofilms concurrently with nitrification of adsorbed $NH_4^+$ ions.

Conceptually, the means of achieving net zero yield in the system 10 is to force endogenous respiration within system biofilms. Quantitatively, there are problems with this design approach. Endogenous respiration is a lumped concept that covers several mechanisms and processes such as cell maintenance, auto- and induced cell lysis, endogenous respiration, and predation by higher organisms like protozoa. As such, endogenous respiration is poorly characterized in terms of mechanisms. Methods to determine endogenous respiration rates are conducted with batch experiments using starved suspended bacterial biomass. A first-order curve is then fit to the data. Endogenous respiration is thus modeled as a functional "black box" that is blind to the sensitivity of the lumped process factors that may affect key mechanisms. Given the inherent complexity of this lumped process and, in particular, the complexity of the hydrolysis biochemistry associated with cell lysis and lysis products, it can be concluded that there is no rational design model at present for quantifying endogenous respiration within biofilms.

Qualitatively, a design approach to forcing endogenous respiration is much clearer. Fundamentally, denying biofilms sufficient mass flux of exogenous carbon sources will induce a process of endogenous respiration. Stoichiometry of biochemical processes within a biofilm undergoing endogenous respiration will proceed a rate that is partly dependent on the availability of high-energy terminal electron acceptors such as oxygen or nitrate.

Influent to tidal marsh cells 11 is low in labile carbon, nitrate, and oxygen. Upon drainage biofilms are exposed to high concentrations of oxygen, but are still carbon starved. Accumulation of biofilms is thus initially limited by low carbon and further inhibited by abundant oxygen to drive endogenous respiration.

Recycle of effluent, via the tidal marsh cells 11, to the wetland 30 also induces endogenous respiration of biofilms. The recycle BOD concentration is very low, by design less than 20 mg/L. Labile carbon must then come from lysis of cells within biofilm or consumption of cellular exudates (EPS). Nitrate desorbed into tidal marsh bulk water is largely passed onto the wetland 30 because denitrification within the tidal marsh cell 11 is carbon limited. As the slug of recycle volume flows through the wetland 30, biofilms are subjected to a high-carbon, high-nitrate environment that stimulates endogenous respiration.

Nitrification (conversion of $NH_4^+$ to $NO_3^-$) takes place in the TVFM during the drain cycle. As described earlier, $NH_4^+$ ions adsorb onto biofilms when marsh cells 11 are flooded. There is no inhibition of nitrification by BOD in drained marsh cells 11, and nitrification has been observed to be a high-rate process in the drain cycle of tidal marsh cells 11, the extent of nitrification depending on system design. Increase of recycle rate and the size of the tidal marsh cell(s) affect nitrification performance. It is expected from laboratory data that nitrification to ammonia effluent concentration of 5 mg/L or less are practical using tidal marsh cells that are a small fraction of the surface area of the horizontal flow wetland 30. As such, a marsh cell retrofit of existing horizontal flow wetland is practical to improve nitrification performance.

Denitrification (conversion of $NO_3^-$ to $N_2$) occurs when bacteria use nitrate as a terminal electron acceptor to metabolize organic carbon, typically induced by anoxic or anaerobic conditions. Nitrate desorbs into bulk water when marsh cells flood. When flooded marsh cells discharge into the horizontal flow wetland, nitrate is rapidly consumed in the anoxic zones of the horizontal flow wetland.

Another type of denitrification is possible with the integrated system 10 of the present invention. Nitrate ($NO_3^-$) entering the wetland 30 from the marsh cell 11 can be reduced under anaerobic conditions to nitrite ($NO_2^{2-}$). Anaerobic ammonia oxidizing bacteria (Anammox) then use nitrite to oxidize ammonia directly into dinitrogen gas ($N_2$).

The preferred ecological design elements of marsh cells 11 include frequent aeration of marsh media and plant root zones by tidal water flux, use of media 13 favorable to root 28 penetration, use of coir matting 47 to establish plants 14, and periodic partial inundation of emergent aquatic macrophytes. The emergence of a stable and diverse grazer community is an intentional system effect of these design elements.

Tidal fluctuation in marsh cells 11 draws air though roots 28 and into marsh media 13. The high concentration of oxygen in air aerates the root 28 and media 13 zone. The effects of periodic aeration by draining are profound:

1. Aeration promotes nitrification of wastewater ammonia absorbed on biofilms and media;

2. Prevention of persistent anaerobic conditions in wetland soils (media in this case) significantly enhances plant species diversity;

3. Plant growth is favored by periodic aeration of wetland soils;

4. Enhanced species diversity and plant growth promotes dense standing vegetation;

5. Dense standing vegetation provides large surface areas that are habitat and refuge for a diverse and large community of grazers;

6. Increased plant growth promotes the formation of a thick, permeable root mat;

7. Increased plant growth provides large surface areas for biofilms to form during the flooded phase of the tidal cycle. Treatment surface area is thereby increased in the marsh cells;

8. Marsh influent passes through standing vegetation and the root mat. Particles retained on plant surfaces are subject to intense grazing pressure;

9. Aeration of media prevents excessive build-up of bacteria biomass that could cause unacceptable headloss;

10. Aeration of media promotes grazing of bacterial biomass that would tend to accumulate within media interstices. High population densities of grazers have been documented in aerobic sand. There is no fundamental difference biologically in aerobic sand or larger aggregate.

The marsh cells 11 preferably contain a lightweight aggregate made of expanded shale. The bulk density of the aggregate is approximately 55 lbs/ft$^3$. The low bulk density combined with an effective porosity of approximately 40% promotes penetration of roots 28 deep into the media 13. In contrast, standard aggregates used in conventional horizontal subsurface flow marshes tend to inhibit significant root penetration. Deep penetration of roots into marsh cell media such as expanded shale positively affects populations of grazer ciliated protozoan communities that feed on unicellular bacteria.

The media surface 22 of the marsh cells 11 is substantially covered with coir matting 47. Plants are installed or seeded within this coir mat 47, which promotes quick rooting in a horizontal direction, and is an excellent medium for sprouting and growing seeds. The coir mat 14 also acts as a litter, or detritus, layer prior to the accumulation of plant litter. Like a litter layer, the coir mat 47 provides a moist surface layer in which detritivores find abundant food, habitat, and refuge from predation and environmental upsets. Overall, the coir matting 47 is important to quickly establishing a marsh treatment ecosystem.

Periodic, partial tidal inundation of the marsh plants 14 is important to establish a diverse and large community of grazers. The plant/coir/media 14/47/13 combination supports a large detritivore community as well as a free-swimming filter feeding community. When the marsh 11 is drained, aquatic detritivores and filter feeders find refuge in the coir mat 47, roots 28, and moist lower thatch. Terrestrial detritivores may feed at the marsh surface 22 while the marsh cell 11 is drained, but find refuge from drowning while the cell 11 is flooded by crawling up plant leaves and stalks. When the marsh cell 11 is flooded, free-swimming filter feeders emerge from the root/coir mat 28/47 to feed on suspended bacteria. Aquatic detritivores are free to feed on surfaces in the flooded zone.

Tidal flooding and draining therefore provide a variety of ecological niches for grazers to exploit. In nature, tidal freshwater wetlands are known to have abundant and diverse populations of grazers because of this variety of niches. In the present treatment system 10, the abundance and variety of grazers translates to removal of VSS by the grazer community.

The large plant surface area in contact with water during the flooded phase of the tidal cycle is colonized by photosynthetic biofilms known as periphyton. Periphyton is sensitive to drying, but in a thick plant thatch much of it remains moist during the drained phase of the tidal cycle. During the flooded phase, periphyton oxygenates the free water above the media 13 and roots 28. The tendency of bacterial respiration to remove oxygen from water is then at least partially counterbalanced by photosynthetic oxidation of the water column by periphyton. Grazers may consume VSS for longer periods, if not throughout, the flooded phase of the tidal cycle.

Oxygenation by periphyton is especially important during periods of passive flow or delayed drainage. Establishing anoxic conditions for denitrification and positive dissolved oxygen concentrations to maintain grazer populations appear to be mutually exclusive functional requirements. However, simultaneous photosynthetic oxygen transfer promotes a positive dissolved oxygen concentration in the flooded free water surface while bacterial respiration in the media drives interstitial water to negative ORP values.

CONCLUSIONS

The present system 10 is believed to represent a significant improvement over existing wetland wastewater treatment technology. One important improvement to the existing art is that tidal flow cells 11 of the current invention 10 can be economically incorporated into existing constructed wetlands for wastewater treatment to substantially improve performance.

It is believed that the integration of a horizontal flow wetland integrated with a tidal flow marsh is novel.

Accumulation of biofilms that eventually clog media pore spaces is a function of influent organic carbon (measured as BOD or COD) and rate limitation of biofilm endogenous respiration. Endogenous respiration is a lumped parameter aggregating diverse processes such as oxidation or hydrolysis of intra- and extra-cellular storage products, auto- and induced cell lysis, and predation of bacteria by eukaryotes. Recycle flux of water through the tidal marsh cell(s) has a very low BOD, has a significant concentration of nitrate, and may have a positive dissolved oxygen concentration in certain embodiments. Thus biofilms in the horizontal flow wetland in contact with the tidal recycle flow tend to have bacterial respiration limited by labile carbon substrate, but not high-energy terminal electron acceptors. Rather than obtaining organic carbon substrate dissolved in water, the substrate is extracted from the biofilm itself, either from extra-cellular sources or from the cells themselves. The net result is that accumulation of biofilms is limited by availability of carbon in biofilms.

In contrast, conventional SSHF flow wetlands tend to clog near or at the inlet zone because of excessive accumulation of biofilms. In the highly anaerobic conditions found in conventional SSHF wetlands there is no shortage of carbon; rather there is shortage of high-energy electron acceptors to oxidize carbon in biofilms.

The net effect of improved endogenous respiration is to improve the hydraulic characteristics of the integrated SSHF tidal flow system. By substantially reducing the tendency for the inlet zone to clog, design flow through the wetland component is maintained.

BOD removal is enhanced in the present system 10 by the introduction of nitrate and oxygen into the horizontal flow bed by the tidal flow cell(s) (Table 3). Conventional SSHF wetlands are anaerobic, which limits the rate of BOD removal. Increasing the rate of BOD removal by the introduction of oxygen and nitrate increases overall treatment efficiency.

Neither surface nor subsurface horizontal flow treatment wetlands are effective for nitrification. Without nitrification total nitrogen removal is limited. One response to this problem has been to integrate a trickling filter into the treatment wetland process. A pump transfers effluent from the horizontal flow wetland to a trickling filter placed near or at the wetland inlet manifold. Denitrification of trickling filter effluent then places takes place principally in the horizontal flow portion. A tidal flow cell accomplishes the same treatment end as a trickling filter, but at lower energy cost, as will be discussed below, and greater simplicity.

A drawback to the trickling filter approach to nitrification is energy inefficiency. Influent flow to the trickling filter will be by either a pressure distribution manifold that sprays the pumped water evenly over the filter surface, or by moving water distribution arms as in traditional trickling filters for wastewater treatment. In either case substantial energy is consumed in the tricking filter influent distribution system.

A tidal nitration device, in contrast to a trickling filter, delivers influent to the filter surface via an open pipe without a pressure distribution manifold or moving distributions arm(s), or by a low-head distribution device. Most horizontal dispersion of influent to marsh cells is accomplished by flooding. The purpose of a distribution device is mostly to lower influent velocity to the marsh cells to prevent scouring of media.

The actual energy difference between a trickling filter and a tidal cell depends on the design requirements of an individual project. Low-head pumps are not appropriate for trickling filter distribution systems because of the head losses in the distribution system, whereas low-head pumps are easily employed in tidal flow systems because of the open pipe discharge. Therefore, starting with the type of pump and lower system head losses, tidal flow cells are more energy efficient than trickling filters.

The combination of drain and fill with effluent recycle to the first treatment cells enhances promotes a high level of endogenous respiration of marsh bed biofilms and entrapped VSS. The degree of endogenous respiration promoted results in a net annual effective yield of zero, which in turn maintains hydraulic conductivity of marsh cells.

The advantage of net zero yield is that there is no need to handle biosolids. Conventional wetland treatment systems have this same feature, but at substantially lesser levels of nitrogen removal performance.

The treatment footprint of the integrated tidal marsh—horizontal flow wetland system 10 is approximately the same as conventional treatment wetland sized to remove BOD and TSS. The difference is in nitrogen removal performance. The integrated system 10 is far superior to conventional treatment wetlands for nitrogen removal.

The most fundamental characteristic of wetlands is that their functions are almost solely regulated by microbiota and their metabolism. Therefore, effective process design must take into account the physiological ecology of bacteria growing in a wastewater treatment wetland. Conventional wetland design fundamentally ignores internal biological processes in favor of input-output analyses that have to date failed to produce well-characterized design equations. The current invention 10 takes into account emerging knowledge of internal biological mechanism in wetland design.

The bacterial process of the greatest concern is mass transfer of nitrogen, including nitrification and denitrification. As described earlier, nitrification takes place in the tidal cells during the drained phase through a process of nitration. Denitrification takes place in the horizontal flow cell both in areas of essentially permanent anoxia and in areas that are partially aerated by influent from tidal cells. It is known from research conducted to develop the current invention that aerobic denitrifiers comprise a substantial proportion of the population of denitrifying bacteria in marsh cells. The entire horizontal and the marsh beds can therefore be considered to be denitrifying reactors. Heterotrophic denitrification takes place in the horizontal bed as long as there is sufficient organic carbon substrate and nitrate electron acceptors.

Denitrification in an integrated system may also continues after organic carbon is depleted. In this process Anammox bacteria take carbon from carbonate ions and use nitrite as terminal electron acceptor. Depletion of organic carbon is generally required for Anammox bacteria to become established. The higher ORP value of in the wetland cell 30, which induced by the marsh cells 11, increases the rate of BOD consumption, thereby facilitating a wetland design in which a substantial proportion of media bed is subjected to conditions of very low BOD, zero DO, and measurable nitrite concentrations.

Nitrite comes from two sources. Once source is bacterial reduction of nitrate to nitrite in the marsh cell discharge to the wetland bed. The other is ammonia-oxidizing bacteria living in mircoaerobic conditions that oxidize ammonia to nitrite.

The consortia of bacteria responsible for these aspects of nitrogen mass transfer can be quantitatively characterized within specific zones of the integrated tidal flow system. In doing so, the bacterially mediated elements of treatment process design of the current invention 10 can be optimized.

Cycling of wastewater through the integrated system 10 stimulates grazing organisms. Although protozoa are aerobic, a majority of all protozoa, and especially ciliates, can live under microaerobic conditions. Large populations of grazing protozoa are found in conventional SSHF wetland test cells and in natural aquatic anoxic benthos. Conventional SSHF wetlands tend to maintain high reducing conditions that produce hydrogen sulfide ($H_2S$). Hydrogen sulfide is toxic to protozoa. By avoiding formation of toxic concentrations of $H_2S$, the integrated system 10 of the present invention maintains populations of grazing protozoa. Grazing of bacteria by protozoa reduces VSS in effluent and crops biofilms.

The current invention substantially improves the contribution of plants to treatment in SSHF wetlands. The anaerobic conditions in conventional SSHF wetlands generate significant concentrations of $H_2S$ within the treatment system. Hydrogen sulfide is toxic to plants, causing stress that limits plant growth.

The current invention raises the oxidation reduction potential of inlet areas and areas immediately downstream of the inlets in SSHF wetlands cells sufficiently to suppress hydrogen $H_2S$ production. The ORP is raised by the introduction of nitrate and oxygen from the tidal marsh cell(s). Hydrogen sulfide is produced when sulfur dioxide ($SO_2$) is reduced to $H_2S$. Reduction of $SO_2$ produces less energy than reduction of nitrate ($NO_3$) or oxygen ($O_2$). Competition among bacteria for organic carbon substrate generally favors bacteria using higher-energy electron acceptors. Thus the introduction of $NO_3$ or oxygen ($O_2$) suppresses sulfur reducing bacteria. The ORP where $NO_3$ or oxygen ($O_2$) is present is substantially higher than where $H_2S$ is present.

By raising the ORP in areas of the SSHF wetland where the organic carbon concentration is high, $H_2S$ toxicity to plants is sharply reduced, permitting the plants to produce longer roots and more photosynthetic structure.

For at least these reasons, the integrated wastewater treatment system 10 of the present invention represents a significant advancement of marsh treatment technology. The system 10 can treat wastewater to advanced tertiary standards on footprints one-quarter to one-half the size of known conventional treatment wetlands.

What is claimed is:

1. A wastewater treatment system comprising:
    a vertical flow marsh cell adapted to contain a particulate media and having a top surface, an outlet adjacent a bottom thereof, and means for supporting plants so as to permit roots thereof to extend into the first media, the roots and the media thereby positioned to contact water flowing into and downward through the marsh cell;
    means for transporting water exiting the marsh cell outlet to a second water treatment environment adjacent a first end thereof; and
    means for recycling water from a second water treatment environment outlet adjacent a second end, the second end opposed to the first end, to the vertical marsh cell top surface.

2. The wastewater treatment system recited in claim 1, wherein the marsh call is adapted to support an ecological community capable of reducing system yield to effectively zero over time.

3. The wastewater treatment system recited in claim 1, wherein the particulate media in the marsh cell has a depth less than or equal to 4 feet.

4. The wastewater treatment system recited in claim 1, wherein the media comprises an aggregate comprising elements having a diameter no greater than 1 mm for a system desired to produce treated water to tertiary treatment standards and a diameter no greater than 4 mm for a system desired to produce treated water to one of primary and secondary treatment standards.

5. The wastewater treatment system recited in claim 4, wherein the media comprises expanded shale.

6. The wastewater treatment system recited in claim 4, wherein the media further comprises high-porosity plastic media.

7. The wastewater treatment system recited in claim 1, wherein the marsh cell has a depth from a top to the bottom, the media has a depth from the bottom to the marsh cell top surface, and a difference between the marsh cell depth and the media depth is sufficient to permit the creation of a free water surface above the top surface.

8. The wastewater treatment system recited in claim 7, wherein the difference comprises an operating depth less than or equal to 2 feet.

9. The wastewater treatment system recited in claim 1, wherein the water recycling means comprises a pump in fluid communication with the second water treatment environment outlet and a low-head distribution system in fluid communication with the pump, the distribution system positioned to discharge water onto the marsh cell top surface.

10. The wastewater treatment system recited in claim 9, wherein the distribution system is adapted to disperse an energy of discharged water at an energy sufficient to avoid scouring of a surface of the media.

11. The wastewater treatment system recited in claim 1, further comprising means for controlling the recycling means and the means for transporting water exiting the marsh cell in order to effect cycles of filling and draining of the marsh cell.

12. The wastewater treatment system recited in claim 11, wherein the controlling means comprises controlling a time during which the marsh cell is substantially drained sufficient to effect aeration of the media and plant roots growing therein.

13. The wastewater treatment system recited in claim 12, wherein the marsh cell drained time is further sufficient to permit sufficient aeration to substantially prevent biomass buildup on a surface of the media.

14. The wastewater treatment system recited in claim 1, wherein the marsh cell comprises a plurality of marsh cells configured in a parallel orientation, and the recycling means comprises means for splitting the water being recycled substantially evenly among the marsh cells.

15. The wastewater treatment system recited in claim 1, further comprising a coir mat positioned atop the marsh cell top surface, the mat for supporting the plants.

16. A method for treating wastewater comprising the steps of:
    exposing wastewater to be treated to a first environment that is substantially anaerobic/anoxic;
    transporting water from the first environment to a second environment comprising means for transforming ammonia ions into nitrate ions, the nitrate ions soluble in the water in the second environment;
    transporting the water containing nitrate ions from the second environment back to the first environment;
    exposing the nitrate ions to bacterial respiration in the first environment to yield nitrogen gas, and
    controlling the transporting steps in order to effect cycles of filling and draining of the second environment;
    wherein the second environment contains particulate media and plants having roots growing into the media, and the controlling step comprises controlling a time during which the second environment is substantially drained sufficient to effect aeration of the media and the plant roots.

17. A method for treating wastewater comprising the steps of:
    recycling water exiting a water treatment environment to a top surface of a vertical marsh cell, the vertical flow marsh cell adapted to contain a particulate media and having a top surface, an outlet adjacent a bottom thereof, and means for supporting plants so as to permit roots thereof to extend into the first media, the roots and the media thereby positioned to contact water flowing into and downward through the marsh cell;
    transporting water exiting the marsh cell outlet to an inlet of the water treatment; and
    controlling the recycling and the transporting steps in order to effect cycles of filling and draining of the marsh cell.

18. The wastewater treatment method recited in claim 17, wherein the marsh cell has a depth from a top to the bottom, the media has a depth from the bottom to the marsh cell top surface, and a difference between the marsh cell depth and the media depth is sufficient to permit the creation of a free water surface above the top surface.

19. The wastewater treatment method recited in claim 18, wherein the difference comprises an operating depth less than or equal to 2 feet.

20. The wastewater treatment method recited in claim 17, wherein the recycling step comprises discharging water at an energy sufficiently low to avoid scouring of a surface of the media.

21. The wastewater treatment method recited in claim 17, wherein the controlling step comprises controlling a time during which the marsh cell is substantially drained sufficient to effect aeration of the media and plant roots growing therein.

22. The wastewater treatment method recited in claim 21, wherein the marsh cell drained time is further sufficient to permit sufficient aeration to substantially prevent biomass buildup on a surface of the media.

* * * * *